United States Patent
Schalk et al.

(10) Patent No.: US 6,631,641 B1
(45) Date of Patent: Oct. 14, 2003

(54) DEVICE AND METHOD FOR DETERMINING FREQUENCY AND AMPLITUDE OF AN OSCILLATING STRUCTURE, ESPECIALLY FOR MEASURING ACCELERATION OR ROTATIONAL RATES

(75) Inventors: Josef Schalk, Altheim (DE); Stefan Sassen, München (DE); Wilhelm Ficker, Pöring (DE); Konrad Lentner, Mintraching (DE)

(73) Assignee: Eads Deutschland GmbH, Munich (DE)

(*) Notice: Subject to any disclaimer, the term of this patent is extended or adjusted under 35 U.S.C. 154(b) by 179 days.

(21) Appl. No.: 09/762,221

(22) PCT Filed: Jun. 6, 2000

(86) PCT No.: PCT/DE00/01824
§ 371 (c)(1),
(2), (4) Date: Feb. 5, 2001

(87) PCT Pub. No.: WO00/75676
PCT Pub. Date: Dec. 14, 2000

(30) Foreign Application Priority Data

Jun. 8, 1999 (DE) .................................. 199 25 979

(51) Int. Cl.⁷ .................... G01C 19/00; G01P 15/125
(52) U.S. Cl. .................... 73/504.03; 73/514.32
(58) Field of Search .................... 73/504.01, 504.04, 73/504.12, 504.03, 505, 514.02, 514.32, 504.14, 510, 511, 514.29

(56) References Cited

U.S. PATENT DOCUMENTS 4,598,585 A   7/1986  Boxenhorn ............... 73/504.12
5,313,835 A   5/1994  Dunn ........................ 73/505
5,618,338 A   4/1997  Kurabayashi et al. ..... 106/26 R
5,698,783 A * 12/1997 Murakoshi et al. ....... 73/504.03
6,196,067 B1 * 3/2001  Martin et al. ............. 73/514.32

FOREIGN PATENT DOCUMENTS

| DE | 4242557  | 10/1997 |
|----|----------|---------|
| EP | 0726158  | 8/1996  |
| EP | 0739743  | 10/1996 |
| JP | 8295034  | 11/1996 |
| JP | 10338830 | 12/1998 |
| WO | 9534798  | 12/1995 |

* cited by examiner

Primary Examiner—Helen Kwok
Assistant Examiner—Tamiko Bellamy
(74) Attorney, Agent, or Firm—Ladas & Parry

(57) ABSTRACT

A device for determining the frequency and/or the amplitude of a vibrating structure includes a vibrating element (2) and a pair of position sensors (10, 11) for the determination of the deflection of the vibrating element (2). The position sensors (10, 11) are arranged such that their measurements during a half-wave of vibration exceed and/or are less than one another. A comparator compares the measurements of the two position sensors (10, 11) to determine a threshold value $U_s$ for the half-wave of the vibration at which their measurements are equal. A device is used for determining the duration during which the measurement of one of the two position sensors (10, 11) exceeds or is less than the threshold value $U_s$. The position sensors (10, 11) can be capacitors whose electrodes are arranged in a step-like manner. The determination of the amplitude of the vibration is, carried out independent of a potential parallel shift of the movable element (2), such that there is no distortion of the measurement result.

17 Claims, 2 Drawing Sheets

DEVICE AND METHOD FOR DETERMINING FREQUENCY AND AMPLITUDE OF AN OSCILLATING STRUCTURE, ESPECIALLY FOR MEASURING ACCELERATION OR ROTATIONAL RATES

BACKGROUND OF THE INVENTION

The present invention relates to a device and a method for determining the frequency and/or amplitude of a vibrating structure, particularly for the measurement of accelerations or angular rates.

Vibrating structures have various engineering applications, For example, they are used as acceleration and/or angular rate sensors, where movement quantities can be determined from the vibration characteristics.

The U.S. Pat. No. document 4,598,585 describes an angular rate sensor where a mass is supported around two axes (x-axis, y-axis) that are perpendicular to one another in a vibrating manner. To determine the angular rate around the z-axis that runs vertically to the x- and y-axis, the element is excited to a periodic vibration around the y-axis. The Coriolis forces during the rotation cause an additional vibration of the element around the x-axis, whereby the amplitude is a measure for the angular rate. Such an angular rate sensor with dual cardanic suspension is shown in FIG. 3.

Additionally, acceleration sensors are known that carry out an oscillating movement, whereby the frequency is a measure for acceleration acting in a certain direction.

However, the known vibrating structures have the disadvantage that no distinction can be made between a change in vibration amplitude and a parallel shift of the vibrating element. For example, distance changes of the suspension of the moveable element may occur that falsify the measured quantity. When sensing the position or the deflection of the vibrating element with a capacitor, the smallest changes in the distance of the capacitor plates can overlay the actual vibration amplitude such that exact measurement results are no longer possible. This applies particularly in cases where the interference or the parallel shift is in the same frequency range as the excited vibration.

It is, therefore, the objective of the present invention to create a device for the determination of the frequency and/or amplitude of a vibrating structure and to provide a method for measuring the vibration amplitude with a high degree of accuracy, whereby interferences, e.g., due to a parallel shift or a distortion of the structure can be suppressed effectively.

SUMMARY OF THE INVENTION

The device according to the invention for the determination of the frequency and/or the amplitude of a vibrating structure is particularly suited to measure the acceleration or angular velocity and has a movable element that can be excited in vibration, a pair of position sensors to determine the deflection of the movable element, that are arranged such that during a half-wave of the vibration their measurements exceed and/or fall short of each other, a circuit for comparing the measurements of the two position sensors for determining from the measurements a threshold value for the half-wave of the vibration, and a device for determining the duration during which the measurement of one of the two position sensors exceeds and/or falls short of the threshold value.

The special arrangement of the position sensors and the comparison of the measurements with threshold value determination in one half-wave of the vibration has the effect that vibration amplitude is determined accurately even with a measurement interference due to a parallel shift of the vibrating element. Errors in determining the amplitude are avoided.

Advantageously, the device comprises another pair of distance sensors to determine a second threshold value for the second half-wave of the vibration. These distance sensors are preferably arranged such that the threshold values in the positive and in the negative half-wave have the same value. Especially in a mechanical structure that vibrates around a defined axis, an acceleration that acts perpendicular to the vibration axis A will no longer result in errors in the amplitude measurement.

Advantageously, the position sensors are capacitors, which results in a cost-effective design. However, they may also be made of optical elements or similar sensors known to the professional for position or distance measurements.

Preferably, one element of a pair of position sensors is arranged higher such that the threshold is set at a defined deflection of the movable element. The threshold values can, for example be activated through mechanical stages, or step-like arrangement of electrodes at a vibration element or on a surface opposite the element. Preferably, the position sensors are arranged at different distances from the rotating axis of the movable element.

The method subject to the invention for determining the frequency and/or amplitude of a vibrating structure comprises the steps: Determining a threshold value in the positive and/or negative half-wave of a vibration, determining the duration for exceeding and/or falling short of the threshold value during a vibration, and determining the frequency and/or amplitude from the duration of exceeding and/or falling short of the threshold value. In this manner, the vibration amplitude can be determined regardless of the distance between the vibrating element and a fixed element and the frequency of the vibration can be determined as well.

Advantageously, a threshold is determined for both the positive and the negative half-wave of the vibration and the frequency and/or the amplitude is determined from the duration of exceeding and/or falling short of the two threshold values. The threshold values in the positive and the negative half-waves may have the same value. Especially, they can be formed by mechanical steps.

In the following, the present invention is described using a preferred embodiment. In the Figures,

Figure 1:
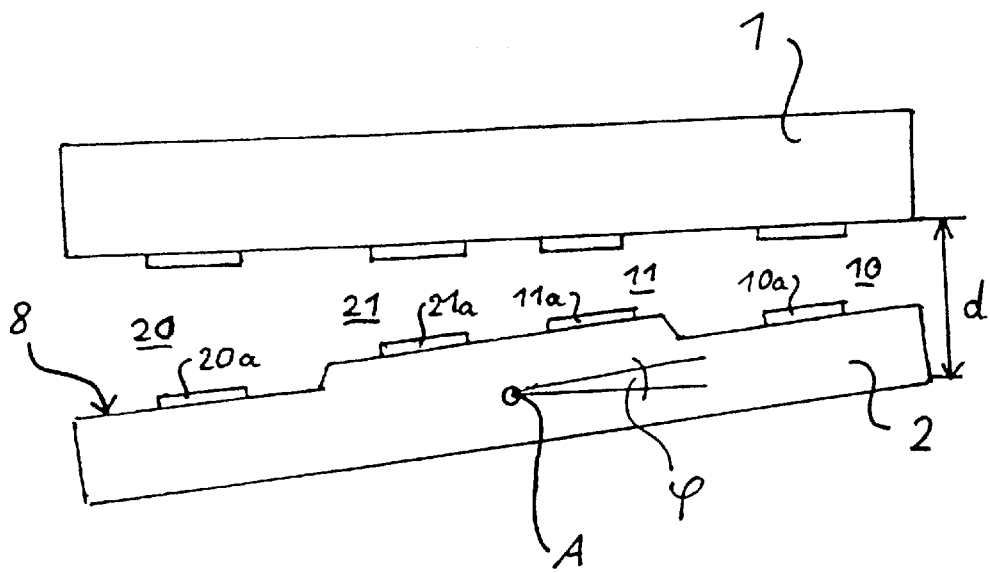
FIG. 1 shows schematically a sectional view of a preferred embodiment of the device according to the invention.

The position sensors 10, 11 are connected with a comparator that compares the measurements of the two sensors 10, 11 and determines a threshold value $U_s$, where the same measurement value applies to both sensors 10, 11. When using a device for measuring the time, the vibration amplitude $A_s$ and the frequency $f_s$ of the vibration can be determined from the threshold value $U_s$ and the signal of a sensor, as will be described in greater detail.

In the embodiment shown here, the position sensors 10, 11 are formed by capacitors. In the preferred embodiment, a pair of position sensors 10, 11 and 20, 21 or capacitors, is located on either side of the rotating axis A of the rocker 2. One electrode 11a, 21a each of a capacitor pair 10, 11 or 20, 21 is attached to the rocker 2 in a raised manner. This results in the fact that the electrodes 11a, 21a that are attached in a raised manner are closer to the counter electrode in the idle position of the rocker, that is, at a deflection angle of φ=0, than the two other electrodes 10a, 20a. In the present case, this is realized in that the surface 8 of the rocker 2, where the electrodes 10a, 11a, 20a, 21a are arranged, has a step-like design. To realize the device subject to the invention, it is, however, also possible to provide the opposite plate 1 with electrodes at different levels instead of the rocker 2. Regardless of the respective embodiment or the concrete design of the position sensors 10, 11 or 20, 21, the important fact is that with a defined deflection of the rocker 2 by the angle φ, two position sensors 10, 11 show the same reading, while their values differ at other angles.

The second pair 20, 21 of position sensors or capacitors has the result that at a certain deflection in either direction, one pair of position sensors will display the same measurement value. This value defines the threshold value $U_s$ of the respective half-wave of the vibration that will be exceeded by one of the measurement signals with a deflection that goes beyond the angle +φ or −φ.

The height of the raise or the overheight of one of the electrodes 11a, 21a of a pair of capacitors 10, 11 or 20, 21 determines the threshold value $U_s$. Thus, the threshold value $U_s$ can be set differently corresponding to the requirements.

Figure 2:
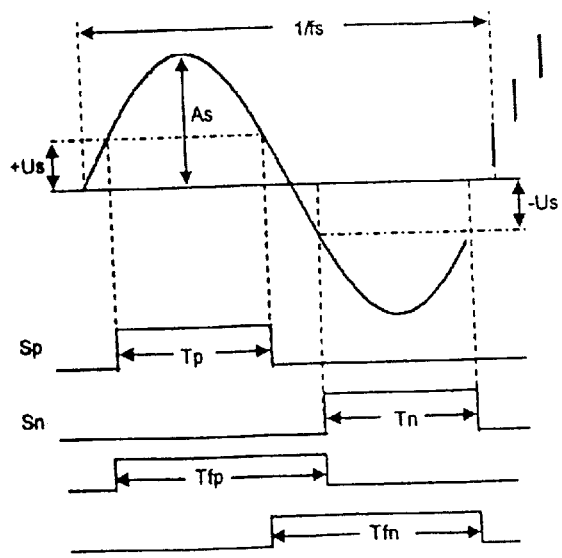
FIG. 2 shows a diagram for explaining the vibration and the characteristic quantities that according to the method of the invention are used to measure the amplitude and frequency.

FIG. 2 will be used to explain how the measurement signals of the position sensors 10, 11, 20, 21 or the capacitors of the vibration amplitude determine the vibration amplitude regardless of the distance d between the rocker 2 and the plate 1. The signal amplitude $A_s$, for example, is measured using the position sensor 10, which in FIG. 1 is located at the right side of rocker 2 in its outer region. At a deflection from the zero position by the angle φ, the right part of the rocker 2 approaches the opposite plate 1, whereby the two position sensors 10 and 11 will exhibit the same value at a defined angle φ, which will be designated as the threshold value +$U_s$ by the comparator. With a continued deflection in the positive direction, the measurement signal of the position sensor 10 will exceed the positive threshold value or the threshold voltage +$U_s$, will then reach its maximum and then fall short of the threshold voltage +$U_s$ during the movement of the rocker 2 in the counter direction. The duration $T_p$ between exceeding and falling short of the threshold voltage +$U_s$ is measured. Then, the rocker 2 will go through its zero position and a deflection in the counter direction will occur, such that with a negative deflection by the angle −φ, the two position sensors 20, 21 in the left part of the rocker 2 will display the same value from which the threshold value −$U_s$ is formed for the second or negative half-wave. With a continued deflection in this direction, the measurement signal will exceed this threshold value during a duration $T_N$.

The vibration amplitude can now be determined from the threshold voltage $U_s$, the frequency $f_s$ and the duration $T_p$ of exceeding the threshold value +$U_s$, according to the equation $$A_s = \frac{U_s}{\cos(T_p * \pi * f_s)} \quad (1)$$

The frequency $f_s$ can be determined from two successive threshold exceedings in one direction requiring in this case only one pair of position sensors to determine the threshold value of one half-wave.

With two pairs of position sensors 10, 11 and 20, 21, where each pair is located on one side of the rotation axis A, the frequency $f_s$ or $f_{s'\pi}$ can be determined from the duration $T_{fp}$ or $T_{fn}$ according to the equation $$f_s = \frac{1}{2} * T_{fp} \quad (2)$$

or $$f_s = \frac{1}{2} * T_{fn} \quad (3),$$

where $T_{fp}$ is the duration between exceeding the threshold value of the positive half-wave and exceeding the threshold value of the negative half-wave. $T_{fn}$ is the duration between falling short of the threshold value of the positive half-wave and falling short of the threshold value of the negative half-wave.

The step-like signals $S_p$ and $S_n$ are formed from the duration $T_p$, where the amplitude is above the threshold voltage +$U_s$, and the duration $T_n$, where the amplitude is below the negative threshold voltage −$U_s$, and then processed in order to calculate the amplitude and/or the frequency of the vibration regardless of the distance d between the rocker 2 and the plate 1.

The structure or device is produced micro-mechanically, which allows for a cost-effective series production with a small design. The invention has the result that no errors occur in the amplitude measurement when there is a parallel shift of the movable elements 2 that may be caused, for example, by an acceleration acting upon the structure in a direction perpendicular to the rotating axis A.

Figure 3:
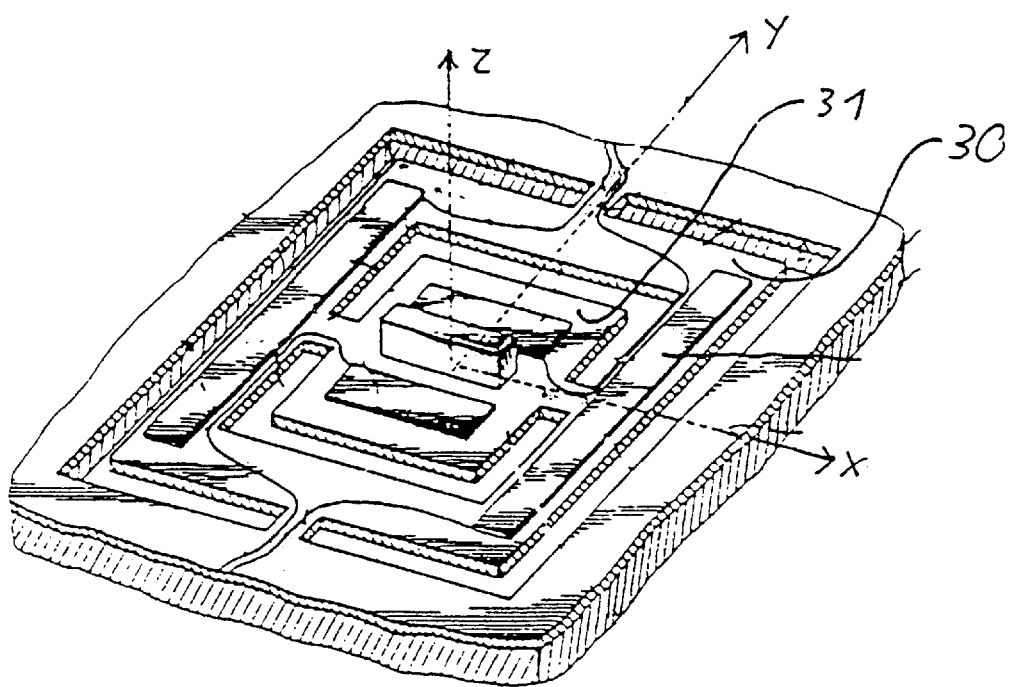
FIG. 3 shows a known angular rate sensor with a vibration-capable structure.

The device subject to the invention may be used, for example, in connection with the known angular rate sensor shown in FIG. 3. There, an inner element 31 is supported in a pivotal fashion around the x-axis in a frame 30 that rotates around the y-axis. The device subject to the invention can be used to measure the deflection of the inner element 31 or the frame 30 without an error occurring in the amplitude measurement due to a parallel shift of the frame 30 or the element 31 and the resultant change in the measurements of individual position sensors. To realize this, pairs of position sensors are arranged at the frame 30 and/or at the inner element 31 to measure the deflection and determine the threshold value. Amplitude and frequency can then be determined from the measurement values as described above, without interferences through a shift influencing the values for the amplitude or the frequency.

Aside from this example, numerous other applications are possible where a deflection of elements supported in a rotating or pivotal manner is used to measure physical quantities. Regardless of the respective application, significant is the fact the interferences that occur when determining the frequency or the amplitude due to the parallel shift or distortion can be avoided.

What is claimed is:

1. Apparatus for determining frequency and/or amplitude of a vibrating structure adapted for the measurement of acceleration and angular velocity comprising:
   a fixed element,
   a movable element facing said fixed element at a distance therefrom, said movable element being excited in periodic vibration about an axis of vibration in a plane of the movable element for undergoing angular vibrating movement around said axis of vibration towards and away from said fixed element,
   first and second position sensors spaced at different distances from said axis of vibration for measuring distance of said movable element from said fixed element as said movable element undergoes vibration around said axis, the first and second sensors respectively including sensor elements supported at different levels on said movable element so that as the movable element vibrates the sensor elements of the first and second sensors are at equal distances from the fixed element for one particular angular position of the movable element in each half wave of the vibration thereof and are at different distances from the fixed element at all other angular positions of the movable element during said vibration thereof, a comparator for comparing distance measurements of the sensor elements to determine a threshold value at which the distance measurements are equal and the movable element is at said one angular position in each half wave of vibration, and a device for determining amplitude and/or frequency of vibration of the movable element from said threshold value, independently of the distance of the movable element from the fixed element.

2. The apparatus of claim 1, wherein said first and second sensors are located on one side of said axis.

3. The apparatus of claim 2, comprising third and fourth position sensors located on an opposite side of said axis of vibration, the first and second position sensors determining the threshold value in one half wave of vibration of the movable element and the third and fourth sensors determining the threshold value in a subsequent half wave of vibration.

4. The apparatus of claim 3, wherein the first and second position sensors and the third and fourth position sensors are arranged such that the threshold values in the half waves of vibration have the same value.

5. The apparatus of claim 3, wherein the position sensors comprise capacitors or optical elements.

6. The apparatus of claim 2, wherein the sensor element of one of first and second sensors is supported at an elevated level on a surface of the movable element such that the threshold value is obtained for a defined particular angular position of the movable element.

7. The apparatus of claim 3, wherein each of the position sensors comprises a pair of electrodes respectively arranged on a surface of the movable element and on an opposite surface of the fixed element.

8. The apparatus of claim 7, wherein the surface of the movable element has a step, one said electrode of one of the sensors being located on said step.

9. The apparatus of claim 1, wherein said sensor elements of said position sensors comprise a fixed electrode on said movable element and an opposite fixed electrode on said fixed element.

10. The apparatus of claim 1, wherein the device for determining amplitude and/or frequency of the moving body determines amplitude $A_s$ of the movable element from the equation $$A_s = \frac{U_s}{\cos(T_P \pi f_s)}$$

wherein $U_s$ is amplitude of the threshold value, $T_p$ is a time interval between successive threshold values in a half-wave of vibration and $f_s$ is the frequency of vibration.

11. The apparatus of claim 1, wherein said fixed element and said movable element are in the form of plates.

12. A method for determining frequency and/or amplitude of a vibrating structure adapted for measurement of acceleration and angular velocity comprising the steps of:

vibrating a plate element in periodic vibration about an axis in a plane of the plate towards and away from a fixed datum, supporting two position sensors on the plate element for measuring distance of the vibrating plate with respect to the fixed datum, arranging the position sensors on the plate to obtain a threshold value ($U_s$) during a half-wave of vibration of the plate at which the distances measured by the two position sensors from the fixed datum are equal, determining time duration ($T_p$) in the half-wave of the vibration between successive threshold values, and determining frequency or amplitude or both of vibration of the plate from the threshold value $U_s$ and time duration $T_p$ independently of spacing between the movable plate and the fixed datum.

13. The method of claim 12, wherein during a positive half-wave of vibration of the vibrating plate, the distance measured by the position sensors exceeds the distance measured at the threshold value whereas during a negative half-wave of vibration of the plate, the distance measured by the position sensors is less than the distance measured at the threshold value.

14. The method of claim 13, wherein for the positive and the negative half-waves of vibration one threshold value is measured for the positive half wave and a second threshold value is measured for the negative half wave, and determining from the respective periods of duration between the two thresholds, the frequency of the vibration.

15. The method of claim 14, wherein the threshold values ($U_s$) in the positive and negative half-waves are equal.

16. The method of claim 12, comprising determining amplitude $A_s$ of vibration of the movable element from the equation $$A_s = \frac{U_s}{\cos(T_P \pi f_s)}$$

wherein $U_s$ is amplitude of the threshold value, $T_p$ is the time interval between successive threshold values in a half-wave of vibration and $f_s$ is the frequency of vibration.

17. The method of claim 12, wherein the threshold value ($U_s$) is obtained by supporting the position sensors at different elevations on the vibrating plate.

* * * * *